INVENTOR.
COLIN BOWNESS

AGENT

United States Patent Office 3,339,150
Patented Aug. 29, 1967

3,339,150
LIQUID COOLED SOLID STATE LASER
Colin Bowness, Weston, Mass., assignor to Raytheon Company, Lexington, Mass., a corporation of Delaware
Filed June 3, 1963, Ser. No. 284,933
3 Claims. (Cl. 331—94.5)

This invention relates to coherent radiation devices such as lasers and masers, and, more particularly, to a solid state laser and associated equipment for extracting heat from the laser during operation.

Laser and maser devices are generally those in which coherent radiation of electromagnetic energy is produced through amplification of radiation by stimulation. The word laser signifies light amplification by stimulated emission of radiation, and the word maser signifies microwave amplification by stimulated emission of radiation. Thus, the difference between a laser and a maser lies in the general frequency range of the stimulated radiation. The present invention is applicable to lasers and masers.

One common type of solid state laser includes an elongated crystal of ruby with reflective surfaces at each end and means for directing radiant pumping energy to the ruby which results in a population inversion of at least one intermediate or metastable energy state of chromium atoms which form part of the crystalline structure of the ruby. That is to say, a relatively large number of chromium atoms will be raised from a low energy state such as the ground state to high energy states, and descend to the intermediate state, and so the number of chromium atoms at the intermediate energy state will become relatively large. Thereafter, a transition will occur from the intermediate or metastable energy state to a lower or to the ground state accompanied by the emission of radiation. This radiation will stimulate an identical transition in other atoms of the chromium which are still at the intermediate energy state resulting in additional radiation, and the additional radiation will be coherent with the stimulating radiation. This build-up of radiation is referred to as stimulated emission of radiation. In operation, the stimulated radiation reflects between the two reflecting surfaces, and thus propagates through the crystal a number of times to thereby build up the level of the stimulated radiation in the crystal. In practice, one of the reflecting surfaces is partially transparent, and so some of the stimulated radiation will emerge from the crystal as a substantially coherent beam and can be used in a variety of ways.

Heretofore, radiant pump energy directed to the laser crystal for causing the population inversion has caused some heating of the crystal and, therefore, the pump energy has been limited. Where it is desired to increase the power output of the stimulated emission from the laser, the amount of radiant energy directed to the crystal must be increased. Another source of heat within the laser crystal results from the emission of phonon energy accompanying certain energy level transistions between upper energy levels and the intermediate or metastable energy level. The radiant pump energy generally raises atoms of the crystal to energy states well above the intermediate or metastable state, and from the latter state transitions to the ground state occur accompanied by emission of he useful stimulated radiation. In some applications, as much as ¼ of the total radiation produced within the crystal by transitions from upper energy levels to lower energy levels is phonon in nature and serves only to heat the laser crystal. As a result of this, as power output from the crystal is increased, heat energy generated within the crystal increases.

One effective way to conduct heat from the laser crystal is to place the surfaces of the crystal in contact with good thermal conductors and direct a coolant over the conductors. The conductors and coolant function as a heat sink to conduct heat from the laser crystal. This technique has met with some difficulty because the conductors and/or the coolant would block the radiant pump enrgy directed to the laser. It is one object of the present invention to provide a solid state laser with a means for conducting heat therefrom without blocking or substantially interfering with the radiant pump energy to the laser required for operation.

In accordance with a principal feature of the present invention, a body of material in which stimulated emission of radiation occurs is enclosed by and in direct contact over a substantial part of the surface of the body with one end of a heat shunt formed of one or more relatively large crystals transparent to the radiant pump energy, and means are provided for maintaining the other end of the shunt crystals at a low temperature at which the thermal conductivity of the shunt crystal is many times higher than at standard temperature. More particularly, the other ends of the shunt crystals are immersed in liquid nitrogen, helium or neon which reduced the temperature of the shunt crystals to below 100° K.

It is another feature of the present invention to conduct heat from a solid laser body to the fluid coolant so that the relatively high heat flux at the surface of the laser body is delivered to the coolant over a relatively large area over which heat flux is relatively low. As a result, heat transfer to the fluid is accomplished below the critical temperature differential and limited to what is sometimes referred to as nucleate boiling. Thus, the temperature of the laser body may be held to within a small differential of the fluid temperature.

As mentioned above, the heat conducting or shunt crystals preferably contact most of the surface area of the laser body. Thus, the pumping radiation is directed through the shunt crystals to the laser. The transparency of the shunt crystals to such radiation must be high so as not to interfere or limit substantially the amount of pump energy directed to the laser body.

Other features and objects of the invention will be apparent from the specific description of the invention taken in conjunction with the figures in which.

Figure 1:
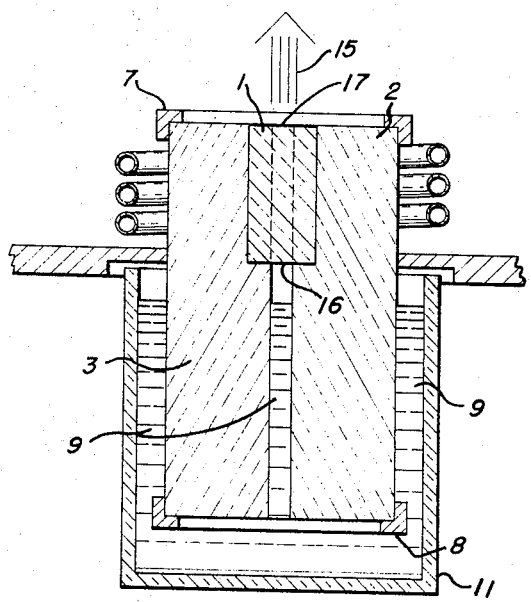
FIG. 1 illustrates a front-sectional view of a solid state laser enclosed by heat-conducting shunt crystals which are cooled by immersion in liquid nitrogen, helium or neon.

Turning first to FIG. 1 there is shown a sectional view of an embodiment of the invention. A body of material 1 in which stimulated emissions occurs is enclosed and in intimate contact with one end of blocks of heat shunt crystals such as 2, 3, 4 and 5. Intimate thermal contact between the shunt crystals and the body 1 may be insured by including a thin film of transparent oil or liquid of a type which remains fluid at very low temperatures between the shunts and the body. It is preferred that this transparent film completely fill all spaces between the body 1 and the shunts to insure good optical and thermal continuity therebetween.

Figure 2:
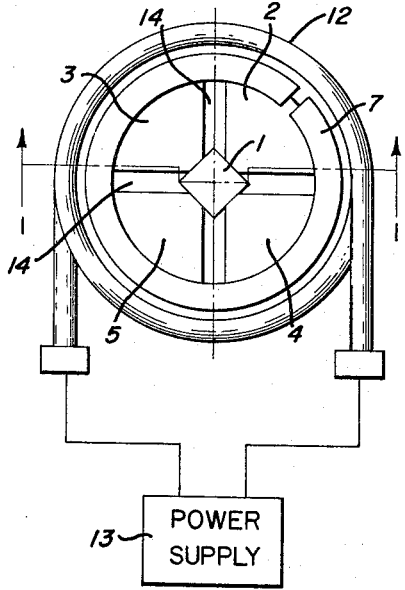
FIG. 2 is a top view of the device illustrating suitable shapes of the shunt crystals and orientation relative to the solid state laser.

The shunt crystals and the laser body 1 are securely held together by ring clamps 7 and 8 encircling opposite ends of the shunts. These clamps are preferably of noncorrosive material and, as shown in FIG. 2, each may be broken so as not to form a continuous ring, permitting expansion while at the same time providing uniform pressure to the shunt crystals.

A substantial portion of each of the crystals 2 to 5 extends into a low temperature fluid 9 which is carried by a container 11. This fluid may be, for example, liquid nitrogen, helium or neon and serves as a heat sink to maintain the temperature of the shunt crystals below 100° K. The surface area of the shunt crystals 2 to 5 which extends into the fluid 9 is substantially greater than the surface area of laser body 1. Thus, heat flux at the surface between the crystals and fluid is substantially less than at the surface of the laser body.

Figure 3:
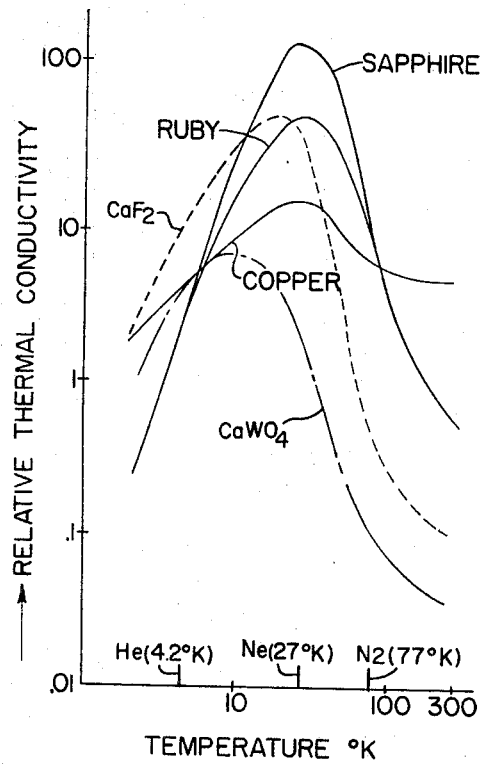
FIG. 3 shows plots of relative thermal conductivity versus temperature to show the high thermal conductivity of a number of suitable shunt crystals at low temperature for comparison with copper.

In this temperature range, selected crystal materials have coefficients of thermal conductivity which are as much as one hundred times as great as the coefficients of the crystals at standard temperature. At the same time, the selected crystals are substantially transparent to the effective pumping radiation, and so they do not interfere with the direction of pump radiation to the laser body Examples of suitable crystal materials which have both qualities of transparency and high thermal conductivity at low temperature are illustrated in FIG. 3. FIG. 3 shows relative thermal conductivity versus temperature for sapphire, ruby, $CaF_2$, and $CaWO_4$ crystals. It will be noted that all of these materials are substantially transparent to a range of visible and near visible light frequencies suitable for pumping many solid state lasers. Sapphire is of particular merit because the thermal conductivity of sapphire at around 30 K. is almost 10 times as high as the maximum thermal conductiivity of copper. Ruby and $CaF_2$ also have substantially higher thermal conductivities at low temperature than copper, and $CaWO_4$ is almost as conductive as copper at a low temperature.

A table of suitable combinations of laser crystals, transparent heat conducting shunt crystals, and suitable fluids for reducing the temperature of the shunt crystals and also for reducing the temperature of the laser crystals to a temperature range at which highly efficient operation occurs, is included below.

| Laser | Heat Conductor | Coolant |
| --- | --- | --- |
| Ruby | Sapphire | $N_2$ |
| $CaF_2$; Dy ++ | ---do--- | Ne |
| $CaF_2$; Dy ++ | $CaF_2$ | He |
| $CaWO_4$; Nd +++ | Sapphire | Ne |

The combination of a ruby laser and a sapphire heat shunt appears particularly suitable because ruby and sapphire have substantially the same coefficients of thermal expansion, and so problems arising from creation of stresses between the laser body and heat conducting shunt crystals caused by expansion differentials, would be avoided. The same advantage would also occur in the combination of a $CaF_2$ laser and $CaF_2$ heat conducting shunt crystals. In addition, it is quite possible that both these combinations of laser crystal and heat conducting shunt crystal could be fabricated from a single crystal suitably doped in certain areas to provide the laser crystal. For example, a single sapphire could be formed with a portion thereof doped with small amounts of chromium to form in that portion a ruby. This crystal could be equipped with opposing surfaces, reflecting either externally or internally, to provide the required resonant laser structure. Likewise, a single crystal of $CaF_2$ could be doped in a portion with Dy++, or a single crystall of $CaWO_4$ could be doped in a portion with Nd+++ to thereby provide both the laser crystal and the heat conducting shunt crystal. In all such devices, it is preferred that the laser crystal be located at one end of the unit so that a major portion of the other end of the unit can be immersed in the low temperature fluid which would then be positioned so as not to interfere with the pump radiation directed to the laser crystal from the external source of pump energy.

As mentioned above, it is necessary that the shunt crystal be highly transparent to the effective pump radiation. A convenient source of pump energy for a ruby laser with a sapphire shunt crystal is a xenon or mercury arc lamp. A convenient pump source for a $CaF_2$ laser with either a sapphire or $CaF_2$ shunt crystal is a tungsten lamp. The xenon and mercury arc lamp may also be employed with a $CaWO_4$ laser crystal with a shunt crystal of sapphire or $CaWO_4$. In any event, it is preferred that the shunt crystals also focus the pump radiation, and thus direct it to the laser crystal. This focusing effect is apparent from the view showing the transverse shape of the shunt crystals in FIG. 2. Each of the shunt crystals operates somewhat as a concave lens to direct the pump radiation from the pump energy source 12 to substantially all portions of the laser body 1.

In operation, electric energy from the power supply 13 is applied to the source 12 causing the source to emit high intensity radiation, a substantial portion of which is directed to the body 1 through the spaces such as 14 between the shunt crystals or through the shunt crystals to the body 1. This energy causes a population inversion of an intermediate or metastable energy level of selected atoms within the body 1 so that a lasering action follows, and a beam of substantially coherent radiation 15 is launched from the body for some useful purpose. The body 1 of laser material may be any of a number of suitable crystalline materials such as mentioned above. Generally, efficient lasering action within such bodies requires substantial reflection at opposite parallel surfaces of the body which are transverse to the direction of the coherent radiation launched from the body. In some applications sufficient reflection is obtained within the body by virtue of the optical discontinuities between the body itself and air or other material at the surfaces of the body, and so no specific reflectors need be provided. In other applications, it is preferred that specially made reflective surfaces be provided such as the surfaces 16 and 17 at opposite ends of the body. It is also preferred that the surface 16 be substantially totally reflecting so that little or none of the stimulated radiation emerges therefrom. On the other hand, the reflective surface 17 is preferably only partially reflecting so that the coherent radiation 15 may be launched from the body for utilization.

As already mentioned, the combination of ruby laser and sapphire heat shunts is particularly suitable because ruby is made of substantially the same material as sapphire; that is, sapphire is substantially pure corundum ($Al_2O_3$), and ruby is also composed of corundum and a small percentage of chromium. Thus, the coefficients of thermal expansion of ruby and sapphire over a wide temperature range are substantially the same. Thus, there will be in operation very little movement between the surfaces of the ruby laser and surfaces of the sapphire shunts which contact each other. In addition, the thermal conductivity of ruby follows to some extent the thermal conductivity of sapphire at the low temperature range. This is illustrated in FIG. 3.

This completes the description of the present invention whereby the optical transparency and thermal conductivity of crystalline material are used to advantage to provide a solid state laser capable of operation at high power levels. Inventive features are set forth in the following claims.

What is claimed is:

1. A radiation producing device comprising a solid state laser element in which stimulated emission of radiation occurs when the element is subjected to pumping radiation, said element extending along a predetermined axis, reflective means at the ends of said element providing a resonant cavity extending axially of said element, an elongated crystal of high thermal conductivity material having a first portion enclosing said laser element and in thermal contact therewith throughout the length of the element, said crystal being transparent to pumping radiation and having a second portion extending from said first portion longitudinally of said axis, cooling means contacting said second portion of the crystal and restricted thereto for maintaining the temperature thereof within the range of from zero to about 100° K., and a source of pumping radiation encircling said first portion of the crystal, said laser element being exposed throughout its length to pumping radiation from said source.

2. A radiation producing device as set forth in claim 1 wherein said elongated crystal is comprised of a plurality of segments extending longitudinally of said laser element and spaced apart from one another circumferentially of the element, each segment being in thermal contact with the element, and wherein said cooling means extends into the spaces between said segments in the areas thereof constituting said second portion of the crystal.

3. A radiation producing device as set forth in claim 1 wherein said second portion of the crystal extends into a container, said cooling means is a liquid coolant in the container which surrounds said second portion of the crystal, and said first portion of the crystal extends externally of the container and is encircled by said source of pumping radiation whereby radiation from said source passes through the first portion of the crystal into the full length of the laser element without passing through the liquid coolant.

References Cited
UNITED STATES PATENTS

| | | | |
|---|---|---|---|
| 3,219,585 | 11/1965 | Kaiser | 331—94.5X |
| 3,229,222 | 1/1966 | Sorokin et al. | 331—94.5 |

JEWELL H. PEDERSEN, *Primary Examiner.*

W. L. SIKES, *Assistant Examiner.*